United States Patent [19]

Page

[11] Patent Number: 5,054,720
[45] Date of Patent: Oct. 8, 1991

[54] TRAPPED VORTEX CAVITY

[75] Inventor: Mark A. Page, Cypress, Calif.

[73] Assignee: McDonnell Douglas Corporation, Calif.

[21] Appl. No.: 408,552

[22] Filed: Sep. 18, 1989

[51] Int. Cl.$^5$ .......................... B64C 5/00; B64C 23/06
[52] U.S. Cl. ................... 244/199; 244/90 R; 244/87
[58] Field of Search ............... 244/198, 199, 204, 206, 244/207, 211, 212, 213, 90 R, 87

[56] References Cited

U.S. PATENT DOCUMENTS

| 2,886,264 | 5/1959 | Seager | 244/207 |
|---|---|---|---|
| 2,894,703 | 7/1959 | Hazen et al. | |
| 2,920,844 | 1/1960 | Marshall et al. | |
| 3,000,401 | 9/1961 | Ringleb | |
| 3,092,354 | 6/1963 | Alvarez-Calderon | 244/206 |
| 3,263,945 | 8/1966 | Wimpenny | 244/199 |
| 3,790,107 | 2/1974 | Renshaw | 244/207 |
| 3,831,885 | 8/1974 | Kasper | |
| 3,831,886 | 8/1974 | Burdges et al. | 244/207 |
| 3,974,986 | 8/1976 | Johnstone | |
| 4,039,161 | 8/1977 | Bauer | 244/199 |
| 4,109,885 | 8/1978 | Pender | |
| 4,434,957 | 3/1984 | Maritz | |
| 4,619,423 | 10/1986 | Holmes et al. | |
| 4,802,642 | 2/1989 | Mangiarotty | |

FOREIGN PATENT DOCUMENTS

| 893892 | 10/1953 | Fed. Rep. of Germany . |
| 1272728 | 7/1968 | Fed. Rep. of Germany . |
| 476258 | 12/1937 | United Kingdom . |

OTHER PUBLICATIONS

Krall et al., "Wind Tunnel Tests of a Trapped Vortex--High Lift Airfoil", Dept. of Navy, ATC Report No. B-94300/3TR-10, 2-23-72 to 12-23-72.

Williams et al., "A Comprehensive Plan for Helicopter Drag Reduction", Report to 31st National Forum by Ad Hac Comm. on Rotorcraft Drag, May 14-15, 1975.

Primary Examiner—Galen Barefoot

[57] ABSTRACT

An airfoil having a trailing edge member pivotally connected to a leading edge member. The trailing edge member having a vortex generating cavity that can be exposed or concealed from a stream of fluid flowing over the outer surface of the members.

7 Claims, 2 Drawing Sheets

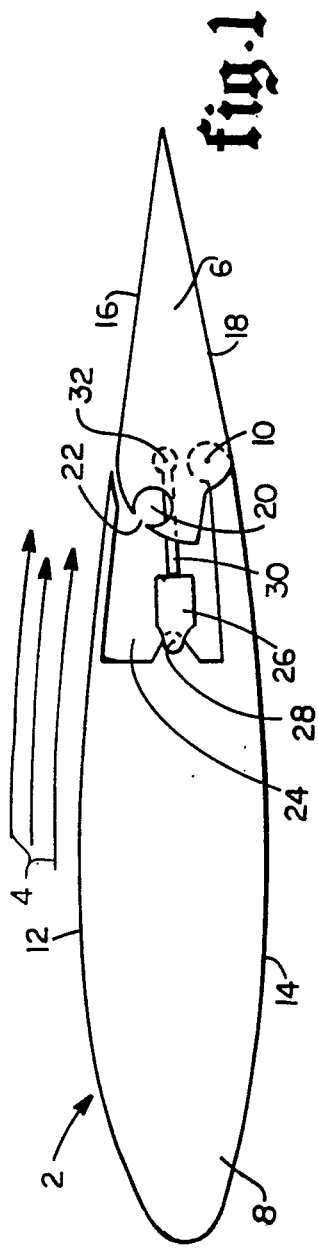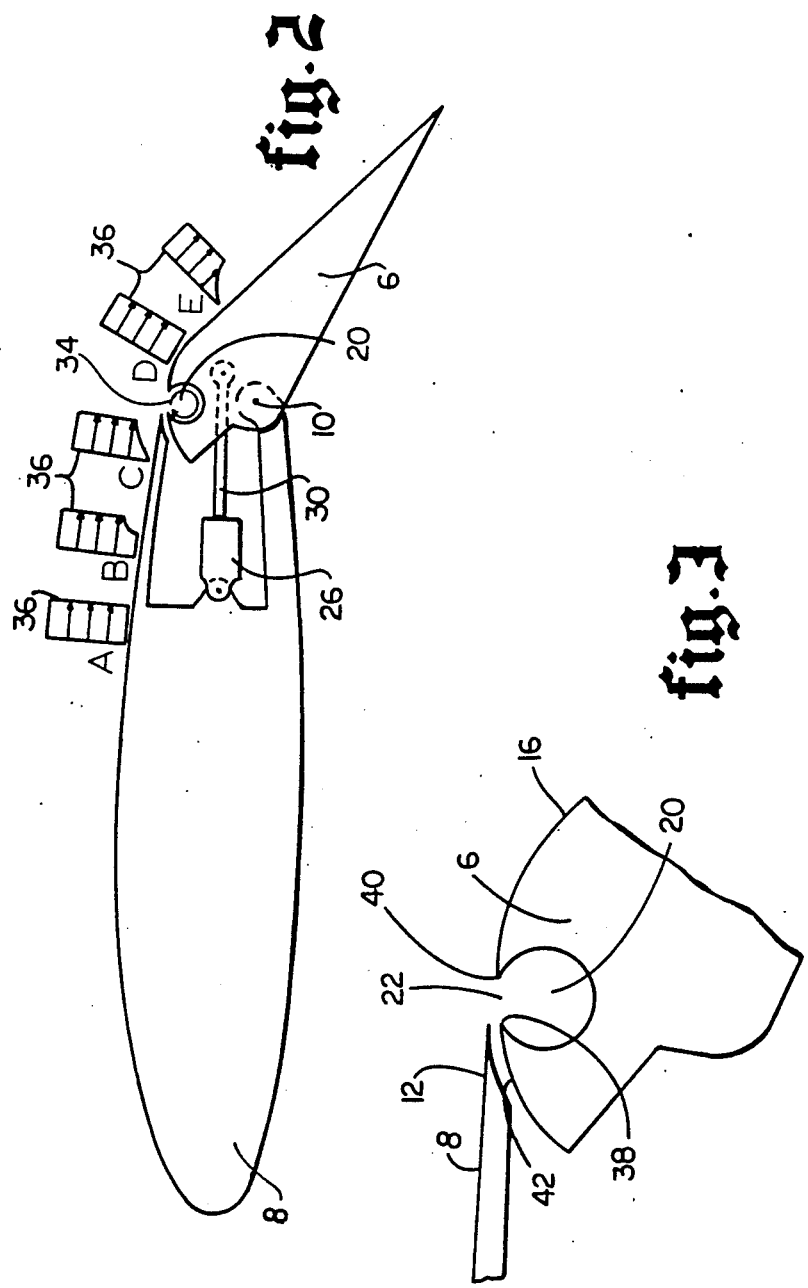

TRAPPED VORTEX CAVITY

BACKGROUND OF INVENTION

To maximize the lift of an aircraft, it is desirable to deflect the flow of fluid over an airfoil through the largest possible angle. In an aircraft, for example, when the airstream passes over an airfoil, the air velocity at the boundary layer decreases due to skin friction. If the flow is further decelerated by the pressure forces that result at high lift conditions, the airstream will separate from the airfoil, causing chaotic air flow, reduced airflow deflection and decreased lift.

It has been known in the art that boundary layer suction or blowing can delay boundary layer separation to a point further downstream. Such systems increase lift but are mechanically complex.

Another type of system that delays airstream separation is shown in Ellis, U.S. Pat. No. 2,899,150, which discloses an airfoil with cavities in the upper surface. In operation, vortices are formed and trapped in the cavities, allowing the airstream to pass over air instead of airfoil skin, resulting in reduced skin friction and increased air velocity near the surface of the airfoil. This in turn delays airstream separation and maximizes lift.

Although the cavities shown in Ellis increase the amount of lift, they also increase the amount of drag across the airfoil, a characteristic that is undesirable when an aircraft is cruising at high speeds. Thus there is a need for an apparatus that exposes a vortex generating structure to the air flow during high lift requirements, and conceals the vortex structure from the air flow when low drag is desired and little lift is needed.

SUMMARY OF INVENTION

This invention is an airfoil that can either expose or conceal a vortex generating cavity from a stream of fluid flowing over the surface of the airfoil surface. The airfoil in the invention, has a trailing edge member pivotally connected to a leading edge member. The trailing edge member has a vortex generating cavity incorporated therein, with an opening in the upper surface of the trailing edge member that is, in one position concealed from the fluid stream. When exposed to the fluid stream, the cavity creates and traps a vortex that reduces the loss of boundary layer velocity and thus delays fluid separation. The airfoil has an actuator that rotates the trailing edge member about the leading edge member, exposing or concealing the cavity from the fluid stream. At high lift conditions, the actuator rotates the trailing edge member to expose the cavity to the fluid stream, providing a vortex generator that delays fluid stream separation. When the vortex is no longer desired, the trailing edge member rotates back to its original position, concealing the vortex generating cavity.

It is therefore an object of this invention to provide a retractable vortex generating cavity in an airfoil, that is simple in use and design.

BRIEF DESCRIPTION OF THE DRAWINGS

The objectives and advantages of the invention, together with any additional advantages, will become more apparent to one skilled in the art, after considering the following detailed description and drawings, wherein:

FIG. 1 is a cross-sectional view of an airfoil constructed, in accordance with the present invention;

FIG. 2 is a cross-sectional view of the airfoil of FIG. 1, showing a vortex cavity structure exposed to a stream of fluid and the resultant boundary layer created by the airfoil;

FIG. 3 is an enlarged view of the vortex cavity as shown in FIG. 2.

DETAILED DESCRIPTION OF THE INVENTION

Figure 4:
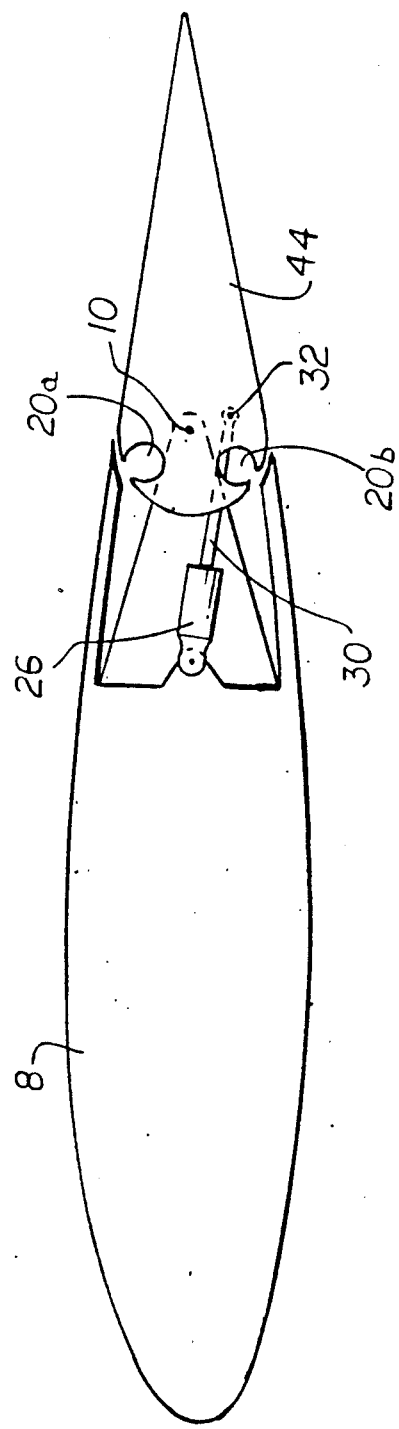
FIG. 4 is a cross-sectional view of a modified airfoil of FIG. 1, wherein the trailing edge member has two vortex cavity structures.

Referring to the drawings more particularly by reference numbers, FIG. 1 shows an airfoil 2 exposed to a stream of fluid 4 flowing in the direction as indicated by the arrows. Any fluid 4 may be used, including but not limited to either air or water, wherein the airfoil 2 may be used in atmospheric or marine applications. The airfoil 2 has a trailing edge member 6 such as a wing flap, pivotally mounted to a leading edge member 8 by conventional attachment means such as a first pin 10. Both the leading 8 and trailing 6 edge members have first and second surfaces, 12, 14 and 16, 18, respectively. The upstream side of the trailing edge member 6 has a cavity structure 20, with an opening 22 in the first surface 16. The downstream side of the leading edge member 8 has a chamber 24 which stores the cavity structure 20, when it is undesirable to expose the cavity to the fluid stream 4. An actuator 26 is pivotally mounted to the leading edge member 8 inside the chamber 24, by attachment means such as a second pin 28. An arm 30 is attached to and extends from the actuator 26, and is connected to the trailing edge member 6, by attachment means such as a third pin 32.

As shown in FIG. 2, when the actuator 26 is activated, the arm 30 is extended, causing the trailing edge member 6 to rotate about the first pin 10. Rotating the trailing edge member 6 exposes the cavity 20 to the fluid stream 4, wherein a vortex 34 forms within the cavity. As the fluid 4 flows across the airfoil 2, the fluid velocity near the first surface 12 decreases due to the frictional drag of the airfoil, as indicated by Positions A and B of the fluid boundary layer 36 shown in FIG. 2. Position C shows the boundary layer 36 in a state close to separation from the airfoil 2. It is at this airfoil location C that the cavity structure 20 should be placed. As the fluid flows over the cavity, the fluid velocity near the first surface 16 increases because of the reduced friction between the boundary layer 36 and the vortex 34. This vortex allows the boundary layer 36 to resume the profile of position A, and delay fluid separation to a point further downstream as shown in boundary layer positions D and E.

It is preferable to have a cavity structure 20 with a circular cross-section, to reduce viscous losses within the cavity. As shown in FIG. 3, it is desirable that the cavity 20 have upstream and downstreams lips, 38 and 40, respectively, that are sharp, to keep the vortex 34 trapped within the cavity 20, although it has been found that the downstream lip 40 may have a slight radius. In addition, the cavity opening 22 should be between 60 and 90 degrees of arc.

The first surface 16 of the trailing edge member 6 should preferably not extend above the first surface 12 of the leading edge member 2. To insure this surface 12 to surface 16 relationship, the front 42 of the trailing edge first surface 16, should have a radius, such that the trailing edge first surface 16 never extends above the first surface 12 of the leading edge 8, whether the cavity 20 is concealed or exposed.

FIG. 4 shows a modified trailing edge member 44 that has two vortex cavity structures 20. This configuration would be particularly useful when the trailing edge member 44 is used as a rudder and fluid stream control is desirable in both directions. To expose the first cavity 20a the actuator 26 will retract the arm 30, rotating the trailing edge member 44 about the leading edge member 8 in a clockwise direction. To expose the second cavity 20b, the actuator 26 will extend the arm 30, rotating the trailing edge member 44 about the leading edge member 8 in a counterclockwise direction.

While certain exemplary embodiments have been described above and shown in the accompanying drawings, it is to be understood that such embodiments are merely illustrative of, and not restrictive on, the broad invention. The invention is not to be limited by the specific constructions or arrangements shown and described, since various other modifications may occur to persons having ordinary skill in the art.

What is claimed is:

1. An airfoil exposed to a fluid stream, having a retractable vortex generator, comprising:
   (a) a leading edge member having an airfoil surface;
   (b) a trailing edge member pivotally attached to said leading edge member, said trailing edge member having an airfoil surface;
   (c) at least one vortex generating cavity structure disposed in said trailing edge member, extending transversely to the direction of fluid flow over said airfoil surface, said cavity structure having an opening in said airfoil surface of said trailing edge member, said cavity structure and said opening being constructed such that when said cavity structure is exposed to the fluid stream, vortices form within said cavity structure, said vortices forming entirely from the free stream flow of said fluid stream, said leading edge member covering said opening when said trailing edge member is in a neutral position; and
   (d) actuator means operatively connected to said trailing edge member, for rotating said trailing edge member with respect to said leading edge member, said cavity opening being uncovered when said actuator means rotates said trailing edge member into a non-neutral position, whereby when said actuator rotates said trailing edge into said non-neutral position, vortices form within said vortex generating cavity structure and delay fluid stream separation from the airfoil.

2. The airfoil as recited in claim 1, wherein the cross-section of said cavity structure is essentially circular in shape.

3. The airfoil as recited in claim 2, wherein said cavity opening has an arc length between 60 and 90 degrees, said trailing edge member being the only member which moves in order to form and stabilize the vortex in said cavity.

4. The airfoil as recited in claim 1, wherein said actuating means includes;
   (a) an actuator mounted to said leading edge member, and;
   (b) an arm, attached to and extending from said actuator and connected to said trailing edge member.

5. An airfoil exposed to fluid stream, having a retractable vortex generator, comprising:
   (a) a leading edge member having an airfoil surface;
   (b) a trailing edge member pivotally attached to said leading edge member, said trailing edge member having an airfoil surface;
   (c) at least one vortex generating cavity structure disposed entirely within said trailing edge member, extending transversely to the direction of fluid flow over said airfoil surface, said cavity structure having an essentially circular cross-section and an opening in said airfoil surface of said trailing edge member, said cavity structure and said opening being constructed such that when said cavity structure is exposed to the fluid stream, vortices form within said cavity structure, said vortices forming entirely from the free stream flow of said fluid stream, said leading edge member covering said opening when said trailing edge member is in a neutral position;
   (d) an actuator mounted to said leading edge member; and
   (e) an arm attached to and extending from said actuator, said arm being connected to said trailing edge member and providing the linkage for rotating said trailing edge member with respect to said leading edge member, said cavity opening being uncovered when said actuator means rotates said trailing edge member into a non-neutral position, whereby when said actuator rotates said trailing edge member into said non-neutral position, vortices form within said vortex generating cavity structure and delay fluid stream separation from the airfoil.

6. An airfoil exposed to a fluid stream, having a retractable vortex generator, comprising:
   (a) a leading edge member having an airfoil surface;
   (b) a trailing edge member pivotally attached to said leading edge member, said trailing edge member having a first and a second airfoil surface;
   (c) at least one first vortex generating cavity structure disposed in said trailing edge member, extending transversely to the direction of fluid flow over said first airfoil surface, said first cavity structure having a first opening in said first airfoil surface of said trailing edge member, said first cavity structure and said first opening being constructed such that when said first cavity structure is exposed to the fluid stream, vortices form within said first cavity structure, said leading edge member covering said first opening when said trailing edge member is in a neutral position;
   (d) at least one second vortex generating cavity structure disposed is said trailing edge member, extending transversely to the direction of fluid flow over said second airfoil surface, said second cavity structure having a second opening in said second airfoil surface of said trailing edge member, said second cavity structure and said second opening being constructed such that when said second cavity structure is exposed to the fluid stream, vortices form within said second cavity structure, said leading edge member covering said second opening when said trailing edge member is in a neutral position; and
   (e) actuator means operatively connected to said trailing edge member, for rotating said trailing edge member with respect to said leading edge member, said first cavity opening being uncovered when said actuator means rotates said trailing edge member in a clockwise direction into a non-neutral position, said second cavity opening being uncovered when said actuator means rotates said trailing edge member in a counterclockwise direction into a non-neutral position, whereby when said actuator rotates said trailing edge into a said non-neutral position, vortices form within said exposed cavity structure and delay fluid stream separation from the airfoil.

7. An airfoil exposed to a fluid stream, having a retractable vortex generator, comprising:
 (a) a leading edge member having an airfoil surface;
 (b) a trailing edge member pivotally attached to said leading edge member, said trailing edge member having an airfoil surface;
 (c) at least one vortex generating cavity structure disposed in said trailing edge member, extending transversely to the direction of fluid flow over said airfoil surface, said cavity structure having an opening in said airfoil surface of said trailing edge member, the cross-section of said cavity structure being essentially circular in shape, said cavity structure and said opening being constructed such that when said cavity structure is exposed to the fluid stream, vortices form within said cavity structure, said leading edge member covering said opening when said trailing edge member is in a neutral position; and
 (d) actuator means operatively connected to said trailing edge member, for rotating said trailing edge member with respect to said leading edge member, said cavity opening being uncovered when said actuator means rotates said trailing edge member into a non-neutral position, said trailing edge member being the only member which moves in order to form and stabilize the vortex in said cavity, whereby when said actuator rotates said trailing edge into said non-neutral position, vortices form within said vortex generating cavity structure and delay fluid stream separation from the airfoil.

* * * * *